INVENTOR.
HENRY J. ZERNAY
BY Amster & Levy
ATTORNEYS

INVENTOR.
HENRY J. ZERNAY

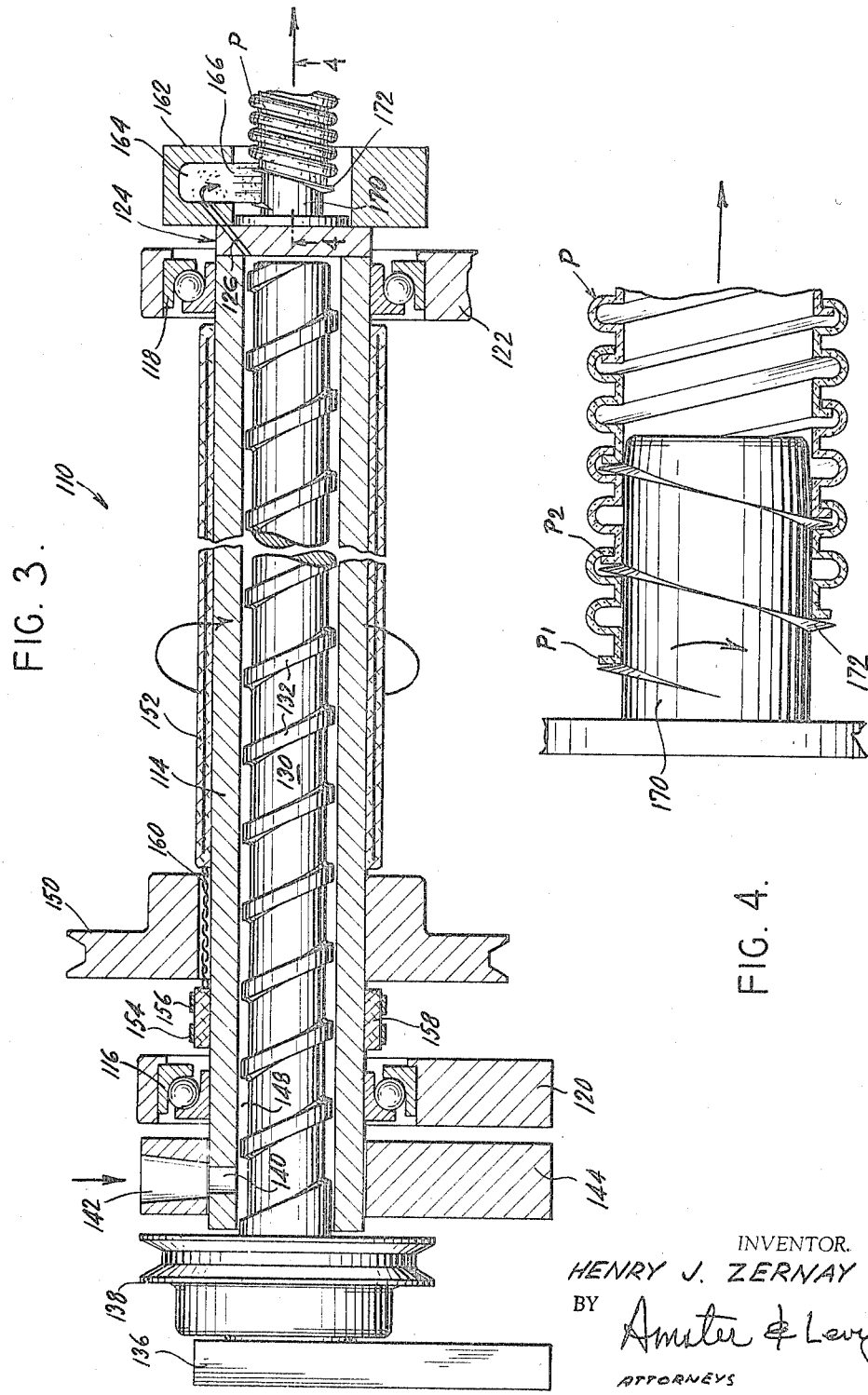

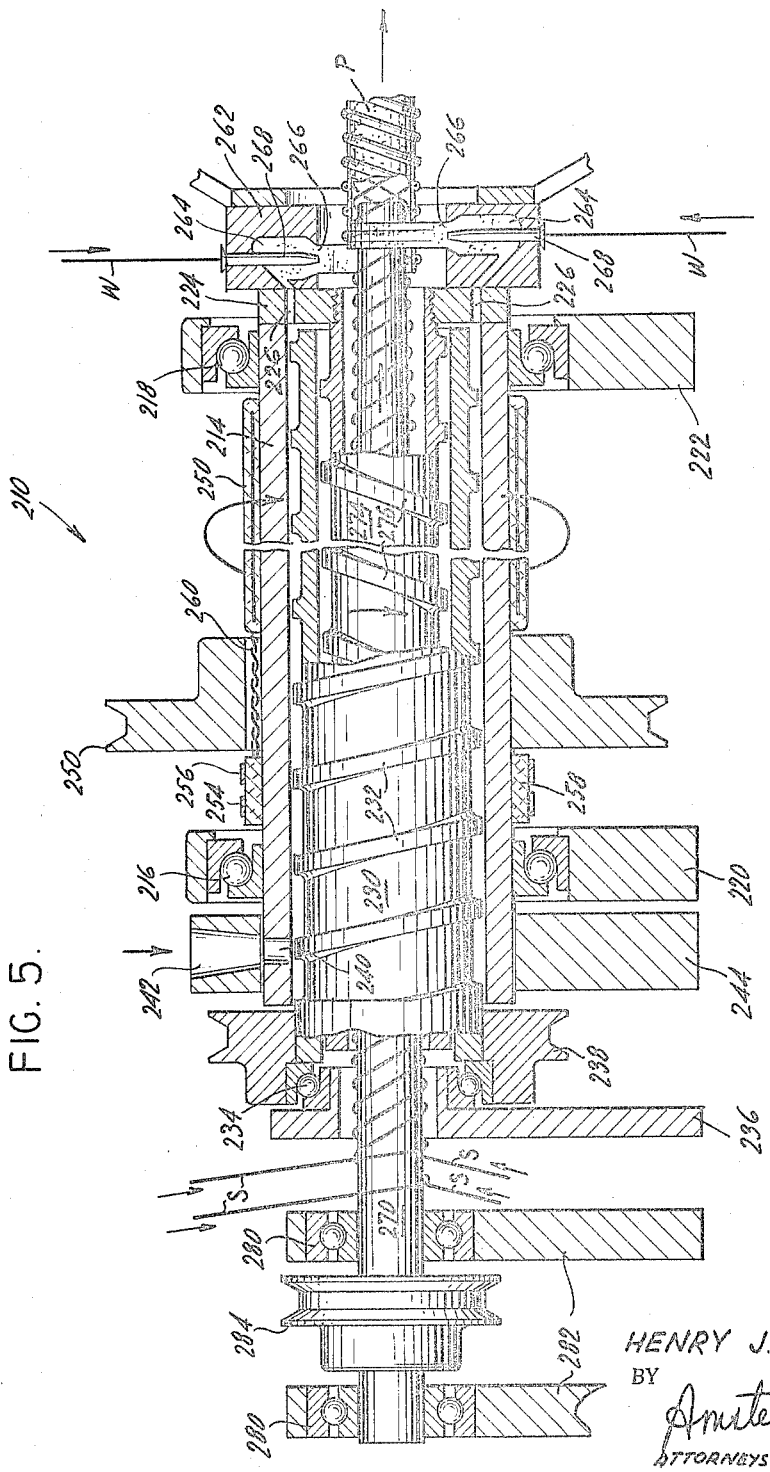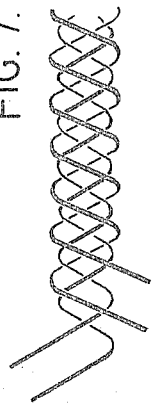

United States Patent Office 3,289,250
Patented Dec. 6, 1966

3,289,250
EXTRUDER
Henry J. Zernay, 37—30 83rd St., Jackson Heights, N.Y.
Filed July 26, 1963, Ser. No. 297,820
5 Claims. (Cl. 18—13)

The present invention relates generally to extrusion equipment and particularly an improved device for extruding plastic, rubber or other extrusion materials in either linear or spiral shapes.

A tremendous variety of products are manufactured by extrusion processes and among these the extrusion of plastics has achieved particular prominence. A number of devices have been devised for the production of plastic extrusions and have met with varying degrees of success. For example, in the extrusion of plastic tubing having either embedded helical wire or helical reinforcement ridges, the art has progressed from complicated hand assembly techniques to fairly sophisticated mass production techniques, however, no successful extruding machine has been produced which will directly produce a spiral extrusion. Such a machine would enable the direct and simple manufacture of simple spiral shapes and would enable the direct and simple manufacture of extruded tubing constructed of continuously extruded spiral members.

Although there have been significant advances made, there remains a substantial need for improved extrusion equipment. Specifically, there have been attempts to produce an extrusion machine which has a rotating extrusion die, i.e., a machine with an eccentrically rotating extrusion orifice, such that the extruded material is produced directly in a helical configuration. Attempts to produce such a construction have failed due to the extremely difficult problems of providing proper sealing between the rotating die and the remainder of the extrusion equipment. The severity of this problem will be appreciated upon consideration of the pressures in the tens of thousands of pounds per square inch and the temperatures in the range of in excess of 1,000° Fahrenheit which are utilized in the extrusion of some plastic materials. It is extremely difficult if not impossible to provide commercially feasible sealing means between a rotating due and the housing of an extrusion device which can, during normal manufacturing abuse, withstand such temperatures and pressures.

Accordingly, it is an object of the present invention to provide an extruding machine which fulfills the requirements for improved equipment which exist in the art. Specifically, it is one of the objects of the present invention to provide extruding equipment which eliminates the sealing problems associated with a rotating extrusion die.

It is further within the contemplation of the present invention to provide an economical and efficient extrusion apparatus for the production of extrusion material in the form of a helical extruded product.

It is a still further object of the present invention to provide means for the efficient production of extruded products wherein the extrusion device itself is of reduced size requiring reduced production space and which nevertheless produces a product of equal if not superior characteristics to those of the prior art.

In accordance with the present invention there is provided an extruding machine which comprises an externally elongated casing which is mounted within appropriate bearing means for rotation about its own axis. An end piece is rigidly secured to one end of the casing and completely closes that end of the casing except for the provision of one or more shaped extrusion orifices formed eccentrically therein, providing an extrusion path from within the casing. An extrusion screw is mounted coaxially within the casing and along the length thereof and substantially blocks the other end of the casing. If desired, the extrusion screw may be mounted on bearings for rotation about its axis. An entry port is provided at the end of the casing removed from the end piece through which the raw extrusion material is supplied. Upon relative rotation of the casing with respect to the extrusion screw, material supplied through the entry port is carried along the length of the extrusion device to the end piece. A heater is provided about the casing to introduce the necessary heat to plasticate the material to be extruded. Upon the continuous relative rotation between the casing and the extrusion screw, the material is heated, worked and compacted to build up the required pressures to force the material through the extrusion orifice. An appropriate mandrel may be provided on the end piece coaxial to the extrusion apparatus and mounted for rotation therewith such that the extruded material may be extruded directly on to the mandrel. Further, the center of the extrusion screw may be hollow such that a core may be fed through the extrusion apparatus and on to which the extruded material may be deposited.

The above brief description, as well as further objects, features and advantages of the present invention, will be best appreciated by reference to the following detailed description of several embodiments of the present invention taken in conjunction with the accompanying drawings wherein:

FIG. 3 is a sectional view taken along the axis of a further embodiment of the present invention;

FIG. 4 is an enlarged sectional view taken along the lines 4—4 of FIG. 3 and looking in the direction of the arrows;

FIG. 5 is a sectional view taken along the axis of a still further embodiment of the present invention;

FIG. 6 is an enlarged sectional view of a portion of the product produced by the apparatus of FIG. 5;

FIG. 7 is an elevational view of another product which can be made on the device illustrated in FIG. 5.

Figure 1:
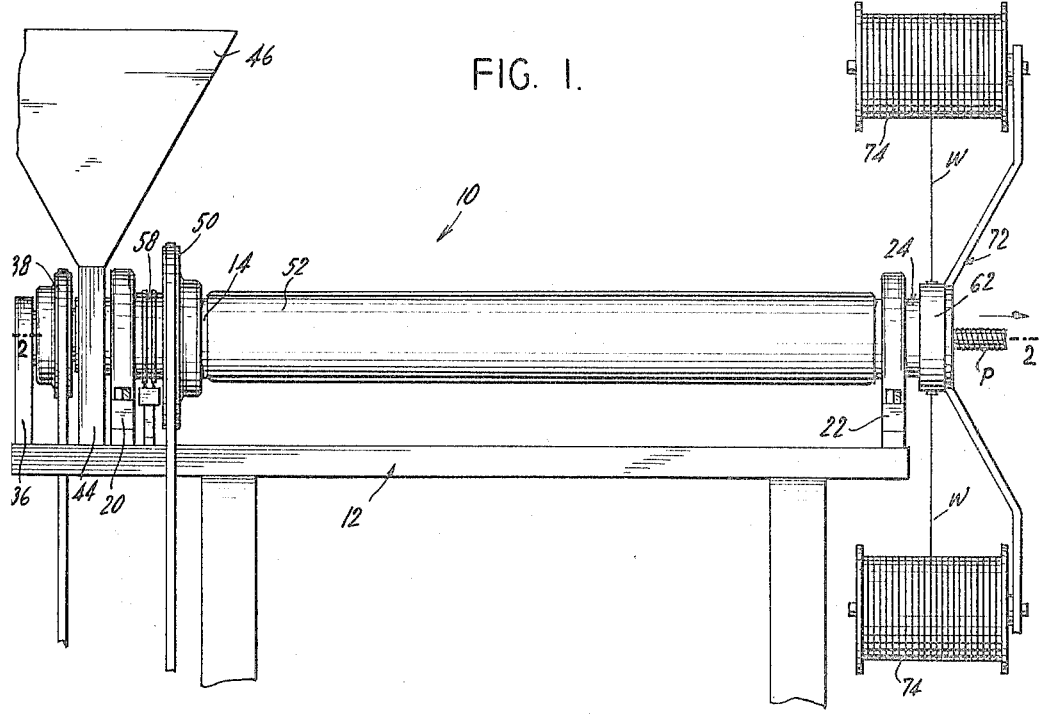
FIG. 1 is an elevational view of an extruding machine according to the present invention.
Figure 2:
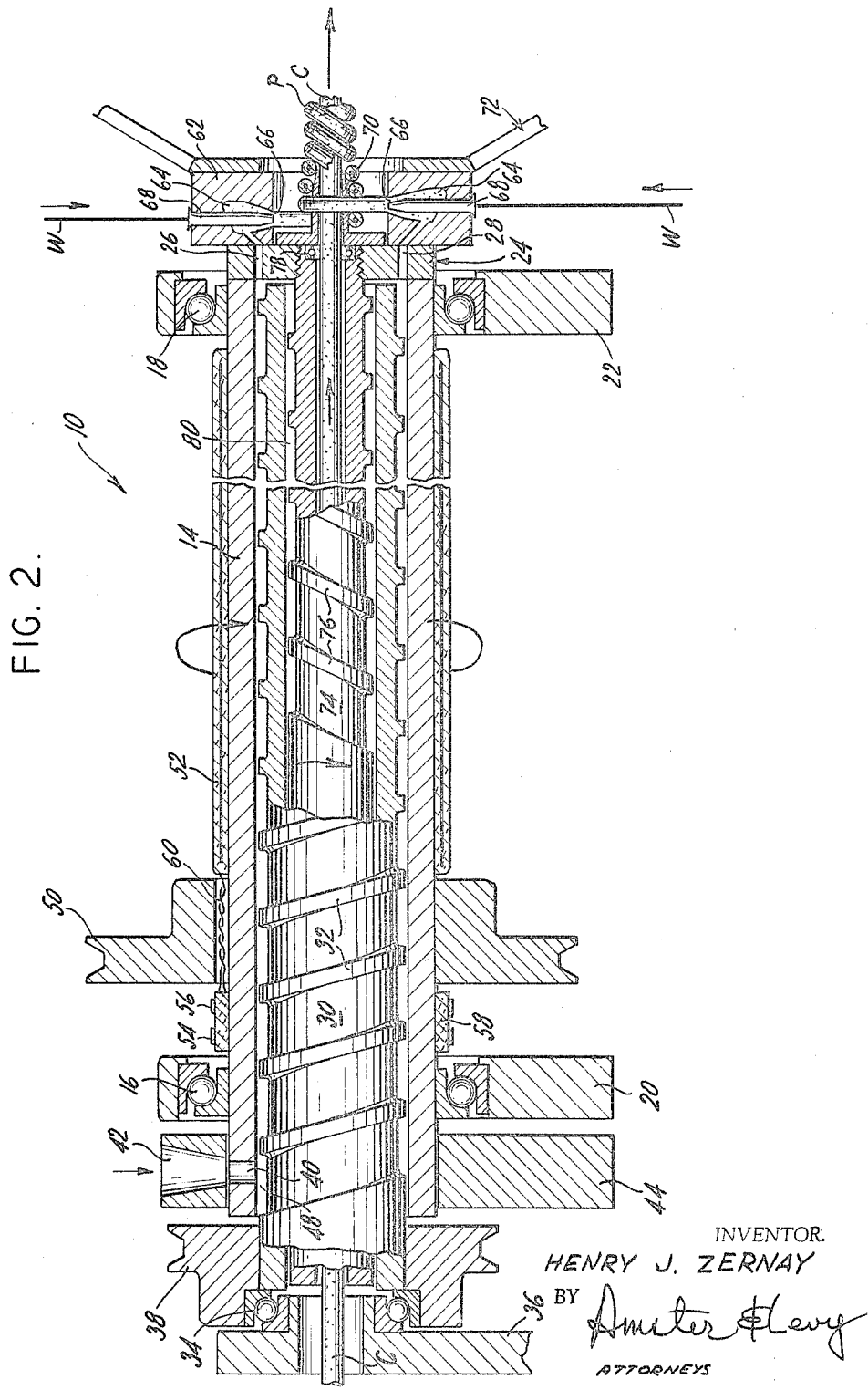
FIG. 2 is a sectional view taken along the line 2—2 of FIG. 1 illustrating the internal construction of the extruding device of FIG. 1.

Referring now specifically to the drawings, and particularly to FIGS. 1 and 2, there is shown an extrusion device generally designated by the numeral 10 which is mounted on a frame or table 12. The extruder 10 comprises an external, generally cylindrical cylinder 14 which is mounted for rotation about its own central axis by a first roller bearing 16 at the rearward end of the casing 14 and a second roller bearing 18 adjacent the forward end thereof. The bearings 16, 18 are mounted on the frame 12 by means of respective bearing mounts 20, 22. The bearings 16, 18 are thrust bearings which are capable of supporting the casing 14 against pressures pushing the casing to the right. An end piece 24 is rigidly secured to the right hand end (as seen in FIG. 2) of the casing 14 by welding or the like and is rotatable therewith. The end piece 24 completely blocks passage from the inside of the casing 14 to the outside, at the right end thereof, with the exception of a pair of extrusion ports 26, 28 which are in communication with the extrusion orifices which will be described below.

Mounted coaxially within the casing 24 is an extrusion screw 30 having right hand threads 32 formed therein. The extrusion screw 30 is, according to well known principles, formed with a major diameter complementary to the internal diameter of the casing 14 such that a relatively firm fit is formed between the screw and the casing. The extrusion screw is mounted on the frame 12 at its left end by means of the thrust bearing 34, the inner race of which is mounted on a bearing support 36 which is in turn connected to the frame 12, and the outer race of which is secured to the end of the extrusion 30. A V-belt pulley 38, shown as an illustrative drive, is secured to the left hand end of the extrusion screw 30 such that the screw may be rotated if desired. However, according to the present invention, rotation of the extrusion screw is unnecessary and, for consideration of the invention embodied in the extrusion device 10, the extrusion screw 30 may be considered to be stationary. Of course, the right hand end of the extrusion 30 is supported through sliding contact between the threads 32 and the internal wall of the casing 14.

The casing 14, at its left-hand end, is provided with an entry port 40 which is in communication with a stationary entry funnel 42 once for each rotation of the casing 14. Specifically, the entry funnel 42 is formed within a solid support 44 connected to the frame 12 which serves as the supporting mount for the hopper 46 (see FIG. 1) which contains the raw extrusion material. The end of the casing 14 is received within a circular opening in the support 44 and the entry port 40 is in registry with the delivery funnel 42 once during each rotation of the casing 14. During that time of registry, material from the delivery funnel 42 fall downwardly into the entry port into the space 48 between the minor diameter of the extrusion screw 30 and the internal walls of the casing 14. It will be appreciated that upon rotation of the casing 14 in the direction of the circular arrow in FIG. 2, there will be relative rotational movement between the casing 14 and the extrusion screw 30 such that extrusion material will be forced from the left hand end of the device 10 to the right hand end thereof. A V-belt pulley 50 is attached to the casing 14 as an illustrative drive therefor, however, a direct gear drive attachment or any conventional direct drive system may be employed.

Heat is applied to the extrusion material as it is moved from the left hand to the right hand end of the casing 14 by the provision of an electrically powered heater 52 which receives its energizing current from a pair of commutator rings 54, 56 which in turn are mounted on an insulating annular block 58 secured to the external wall of the casing 14. Wires 60, appropriately connected to the commutated rings 54, 56, pass through a suitable opening in the pulley 50 for electrical connection to the heater 52.

The extrusion die 62 forms a portion of the end piece 24 and in the present embodiment constitutes a generally annular shaped ring of material having a pair of internal chambers 64 which are in communication with the extrusion ports 26, 28 by appropriate connecting passages. The chambers 64 are in communication with a pair of extrusion orifices 66 which are formed on the inside surface of the annular member 62 such that material forced through the extrusion passages 26, 28 and into the chambers 64 is then forced outwardly of the extrusion die 62 through the extrusion orifices 66. In the present illustrative embodiment a pair of torpedos 68 are mounted within the extrusion die 62 providing a passageway for reinforcement wire W according to well known techniques. By reference to FIG. 1, it may be seen that a support bracket, generally designated by the numeral 72 is mounted on the forward end of the extrusion die 62 which bracket supports a pair of spools 74 which supply the wire W to the extrusion die 62. A tapered mandrel 70 is mounted on the end piece 24 for rotation therewith and extends coaxially of the entire assembly such that extruded material exiting from the orifices 66 is deposited on the mandrel to form a generally helical construction.

The foregoing has been a description of the basic elements in the extrusion device 10 which cooperate to produce the spiral extrusion shape illustrated in FIG. 2. As illustrated in FIG. 2, further mechanisms are incorporated within the extrusion device 10 to provide means by which the helical extrusion product may be applied about a preformed core. As illustrated, a core, designated by the symbol C, is fed into the device 10 through an opening formed in the bearing mount 36 and passes coaxially through the length of the device 10 and through the hollow central portion of the mandrel 70 such that as the extruded material leaves the tapered surface of the mandrel, it is deposited about the core C. This core may be of plastic, paper, wire, wire cable or any other substance as desired. In order to provide unobstructed passage for core C, the extrusion screw 30 is hollow. A secondary screw 74, having an external left-hand thread 76 is mounted coaxially within the extrusion screw 30 and the casing 14 and is of a major diameter which is complementary to the internal diameter of the hollow extrusion screw 30. As seen, the secondary screw 74 is provided with an axial opening through which the core C travels from the left-hand end of the machine, through the entire length of the secondary screw 74, and into the central opening of the mandrel 70. The secondary screw 74 is securely attached to the end piece 24 such that it is rigid with the end piece 24 and the casing 14 and rotates therewith and further such that no exit path for exit for extrusion material is provided along the axis of the end piece 24. It is noted that a small ballbearing 78 is positioned at the exit end of the secondary screw 74 with its outer race secured to the secondary screw 74 and its inner race freely suspended. The bearing 78 serves to center the core C along the axis of the device to assure the concentricity of the end product.

It will be appreciated that the secondary screw 74 functions to provide an unobstructed path for the core C through the length of the machine and at the same time prevents the back flow of the extrusion material away from the end piece 24. Specifically, as the casing 14 and the end plate rotate in the direction shown in FIG. 2, the secondary screw 74 also rotates in the same direction, as indicated by the appropriate arrow in FIG. 2, thus driving any material which find its way into the space 80 toward the end plate 24.

An understanding of the invention as incorporated in the extruded device 10 may be further appreciated by references to the following description of operations of that device. As material to be extruded is introduced in the space 48 between the extrusion screw 30 and the casing 14 through the entry port 40, and upon rotation of the casing 14 driven by an appropriate V-belt about the pulley 50, material will be driven toward the right as viewed in FIGS. 1 and 2. Energization of the heater 52 will provide the requisite heat and the movement of the material along the length of the screw will provide the necessary working to plasticate the material. Continuous relative movement between the casing 14 and the extrusion screw 30 will introduce further amounts of material at the end of the casing 14 until the pressure is sufficient to extrude material through the extrusion port 26 and outwardly through the extrusion orifice 66. At the same time, wire W is fed from the spool 74 to the torpedoes 68 such that the extrusion material exiting from the orifices 66 encapsulates the wire. Rotation of the entire structure of the extrusion die 62 with the casing 14 and the spool support 72, will cause the individual extruded products to be laid down, in spiral configuration, on the tapered mandrel 70. At the same time, a core 60 is introduced through the axial opening along the length of the machine and is pulled, at a controlled rate, outwardly through the central opening of the mandrel 70. As the material is deposited under the mandrel 70, the material previously deposited is removed and is engaged about the core C to form the finished product P shown in FIG. 2. Any material which is forced into the space 80 between the secondary screw 74 and the internal walls of the extrusion screw 30 is prevented from moving toward the left hand end of the device by the relative movement of the secondary screw thread 76 and the extrusion screw 30. It will be appreciated rotation of the extrusion screw 30, superimposed upon the rotation of the casing 14, will serve to vary the flow of material passing down the length of the extrusion screw 30. Therefore, the amount of material passing out through the extrusion die 62 may be varied irrespective of the speed of rotation of the casing 14 and the pitch of the spiral extrusion by introducing rotary movement to the screw 30 through an appropriate V-belt connected to the pulley 38.

It will be appreciated, of course, that a number of variations may be incorporated in the extrusion device 10. For example, any number of standard extrusion die constructions may be incorporated in the end piece 24 wherein one or any number of extrusion orifices are formed and wherein an end product having one or more core materials is produced. Other variations will be described below and still further variations will be obvious to those skilled in the arts.

Now referring to FIGS. 3 and 4, there is shown a further illustrative example of the present invention as embodied in the extrusion device generally designated by the numeral 110. The extruding machine 110 includes a cylindrical hollow casing 114 which is mounted between a pair of thrust roller bearings 116, 118 which are respectively supported on an appropriate frame by the bearing mounts 120, 122. The casing 114 has attached to its forward end an end piece 124 which is provided with an extrusion passage 126 which is in communication with the internal chamber within the casing 114 and the extrusion die 162 which will be described in more detail below. It will be appreciated that the casing 114 may be rotated about its own axis and appropriate pulley 150 is secured to the casing 114 intermediate the bearings 116 and 118 to provide means for delivery of rotary power thereto.

Positioned within the casing 114 is an extrusion screw 130 of conventional design having extrusion threads 132 which are of a major diameter complementary to the internal diameter of the casing 114 such that a relatively tight fit is assured between the extrusion screw 130 and the outer casing 114. The extrusion screw 130 is mounted coaxially within the casing 114 by appropriate bearings, similar to those illustrated in the extrusion device 10 shown in FIG. 2, which in turn are mounted upon a bearing bracket 136. A V-belt pulley 138 is attached to the extrusion screw immediately adjacent its bearing support on the mount 136 such that, if desired, rotational movement may be imparted to the extrusion screw 130, however, the invention does not require that the screw 130 be rotatable.

At the end opposite from the end piece 124, there is provided an entry port 140 formed radially through the casing 114 which is in communication with the internal chamber 148 within the casing 114 and with an entry funnel 142 of the hopper support 144. An appropriate hopper is secured above the entry funnel 142 to provide a ready supply of the raw extrusion material. It will be appreciated that upon relative rotation between the casing 114 and the extrusion screw 130 in the direction as indicated in FIG. 3, material immediately below the entry port 40 will be carried toward the right hand end of the device 110.

A heater 152 is applied about the external surface of the casing 114 and is powered by means of electric current transmitted through the commutator rings 154, 156 which are mounted on the casing on an appropriate annular, insulated block 158 and are appropriately connected to the heater 152 through the wires 160. The heat applied to the extrusion material as it is moved from the left hand end to the right hand end of the device 110 and the work done on the material during that process, will provide sufficient heat and working to plasticate the material and continuous relative rotation between the casing 114 and the screw 130 will sufficiently compact the material at the right hand end of the device to provide the required pressure for the extrusional process. An extrusion die 162 is rigidly secured to the end piece 124 and forms an integral part thereof and has formed therein an extrusion chamber 164 which is interconnected with the extrusion port 126 and which empties to the atmosphere through an extrusion orifice 166. In the present illustrative embodiment, the extrusion orifice forms a relatively thin wall strip having two 180° ribs and a right angle attachment border. The shape of the extrusion orifice 166 may be appreciated by reference to FIG. 4 which illustrates, in enlargement, the extrusion product P. Securely attached along the axis of the extrusion die 162 is a mandrel 170 upon which the extrusion material is deposited as it exists from the extrusion orifice 166. The finished product P formed by the extrusion apparatus is illustrated in FIG. 3 as it is drawn from the mandrel at a rate which is synchronized with the rate of rotation of the die 162 and the casing 114 and related to the width of the extruded plastic.

Referring specifically to FIG. 4, it will be seen that the extruded material is laid down upon the mandrel 170 and overlaps the adjacent edge of the material laid down 360° previously. Specifically, one edge of the extrusion is superimposed over the previously laid down opposite adjacent edge P–2. A series of helical positioning knife edges 172 are provided on the mandrel 170 to accurately position the extrusion product P to assure proper overlap. It will be appreciated, of course, that as the material overlaps in this manner, the respective edges P–1, P–2 will be welded together due to the high temperature of the material at this point. Further, in accordance with standard practices, a collant is applied immediately adjacent the exit of the product P from the mandrel 170 such that the material sets and a unitary product is produced.

A more complete understanding of the extrusion device 110 may be realized from a consideration of the following brief description of its operations. With the heater 152 energized and with a supply of extrusion material available through the entry port 170 into the chamber 148, operations are commenced by rotating the chamber 114 in the direction shown in the arrows. This is conveniently accomplished through an appropriate V-belt provided about the pulley 150. The extrusion screw 130 is held stationary during this process. As relative rotation between those two parts is accomplished, material entering the device through the entry port 140 is carried toward the right and is worked and heated by the operative elements thus compacting the extrusion material at the right hand end of the device and building up the desired extrusion pressures. The material, in response to further relative rotation, is forced out of the chamber 148 through the extrusion opening 126 and into the body of the extrusion die 162 wherein the material is further forced outwardly through the extrusion orifice 166 for deposit on the mandrel 170. In a particular embodiment shown herein, the material extruded is formed into a helix wherein one edge P–1 (see FIG. 4) of the extruded strip is deposited over the opposite and previously extruded edge P–2 forming a continuous helical structure which produces the cylindrical tubing product P. If desired, the amount of material extruded from the orifice 166 may be varied by rotating the extrusion screw 130 about its own axis. Such rotation may be conveniently accomplished by the provision of an appropriate V-belt about the pulley 138. Rotation of the extrusion screw 130 in the direction of the arrow in FIG. 3 will decrease the extrusion pressure and extrusion flow and, conversely, rotation in the opposite direction will increase extrusion pressure and extrusion flow.

Referring now to FIG. 5, there is shown a still further embodiment of the present invention which in most respects is very similar to the device illustrated in FIG. 2. Therefore, only a brief description will be made of the similar constructions with a more detailed description to be made of those features which are different. Specifically, the extrusion device, generally labeled by the numeral 210, comprises a casing 214 mounted for rotation in thrust bearings 216, 218 which are in turn mounted on a frame by bearing support 220, 222. The hollow casing 214 is closed at one end by the end piece 224 which has formed therein an extrusion outlet path 226. Positioned coaxially within the casing 214 is an extrusion screw 230 having a thread 232, the major diameter of which is complementary to the inner wall diameter of the casing 214. The screw 230 is mounted on a thrust bearing 234 which is in turn secured to the frame by a support 236 and is further provided with a V-belt pulley 238 such that the screw 230 may be selectively held stationary or rotated about is own axis.

At the rear end of the casing 114 there is provided an entry port 240 which is in communication, at one time during each revolution of the casing 114, with an entry funnel 242 formed within the hopper support 244. An appropriate hopper is mounted above the entry funnel 242 for the delivery of extrusion material into the chamber 248.

Secured about the periphery of the casing 214 is a standard V-belt pulley 250 and there is also provided an electrically powered heater 252 similar to heater 52 above. The heater 252 is provided with electrical current through the commutator rings 254, 256 which are mounted upon an insulating block 258 and appropriate wiring 260 interconnects the rings 254, 256 with the heater 252. At the forward end of the device 210 an extrusion die 262 is secured to the end piece 224 and includes a pair of extrusion chambers 264 which are in communication with the extrusion ports 226 at one end and which are also in communication with the ambient through the extrusion orifices 256. Appropriate torpedoes 258 are provided within the chambers 264 for the entry of wire W to be embedded in the finished extrusion product. An appropriate support 272 is mounted on the extrusion die 262 to support the reels which provide the supply of wire W.

Positioned within the hollow extrusion screw 230 is a secondary screw 274 having external threads 276 formed in a direction opposite to the threads 234. The secondary screw 274 is itself hollow and is rigidly secured to the end piece 226 such that no additional passage means are provided from the chamber 248 to the outside of the device 210. It will be appreciated that any extrusion material which tends to move towards the left between the secondary screw 274 and the extrusion screw 230 will be driven back toward the end piece 226 by relative movement of the left hand screw threads 276 and the internal walls of the extrusion screw 230.

In the foregoing respects, the extrusion device 210 is virtually identical with the device 10 illustrated in FIGS. 1 and 2. The differences between those two devices relates to the provision of a rotating mandrel which passes completely through the entire device 210. Such construction provides means whereby a finished extruded product may be formed which has a helical core along the internal walls thereof, as illustrated in FIG. 6, or alternatively, that a finished product of essentially mesh-type configuration may be produced with strands rotating in a right hand screw direction and a left hand screw direction with open spaces remaining therebetween. Such a construction is schematically illustrated in FIG. 7.

Mounted along the axis of the screw device 210 is a mandrel 270 which is mounted for rotational movement about its own axis within a pair of bearings 280 which in turn are mounted on a pair of bearing supports 282 secured to the frame of the machine. A V-belt pulley 284 is mounted on the mandrel 270 between the bearings 282 to introduce rotational movement to the mandrel 270. As is illustrated in FIG. 5, a series of plastic strands S may be conveniently fed onto the mandrel 270 to form a helical construction. It will be appreciated that as the mandrel rotates, the strands S will be wrapped thereabout in a helical pattern governed by the rate of rotation of the mandrel and the angle of approach of the strands S to the mandrel. Alternatively, the mandrel may be tapered as shown and the strands may be applied by a suitable rotating assembly. The helical strands will then be easily drawn from the tapered mandrel. The helical assembly of the strands in FIG. 6 underlies the extruded material deposited on the mandrel 270 from the extrusion orifices 266 such that welding of the extruded material to the plastic strands will result to produce a finished mesh product as illustrated in the enlarged sectional view of FIG. 6. Of course, a number of varieties of products may be produced on this machine. For example, the shape of the extrusion orifice may be varied to produce a number of open or closed helical constructions. Further, the internal strands S may be of a variety of pre-extruded shape, textures, colors, materials, etc. Still further, the pre-extruded strands S may be applied over the extruded material. It should be obvious to those skilled in the art that a virtually infinite variety of solid and open helical constructions may be produced on the extrusion device 210.

Figure 8:
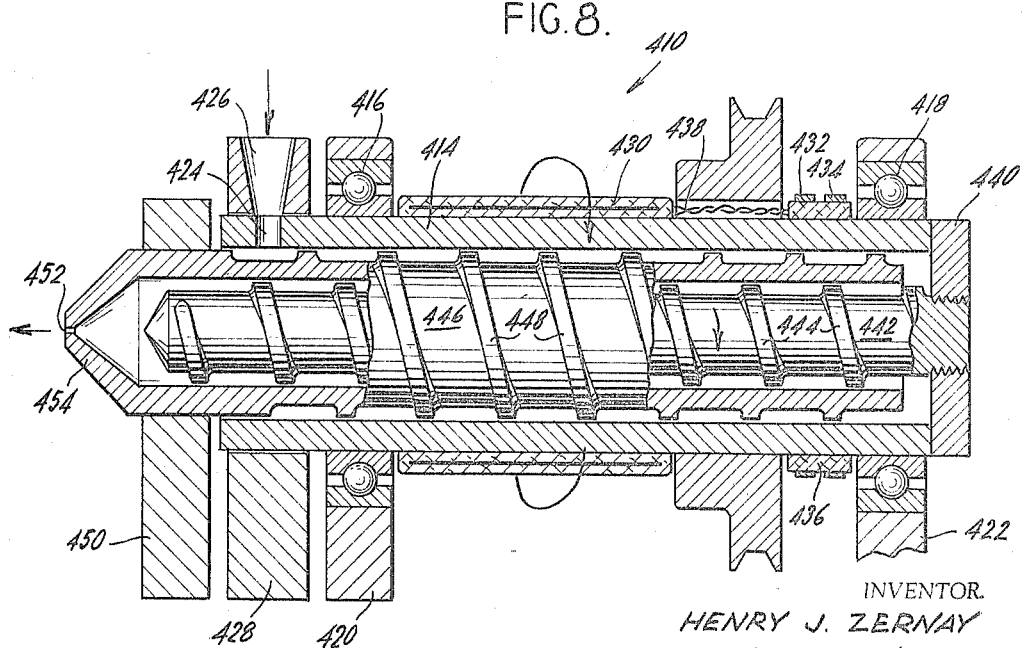
FIG. 8 is an axial sectional view of a still further embodiment of the present invention.

Now, referring to FIG. 8, there is shown an extruder, generally designated by the numeral 410 which incorporates the teachings of the present invention and illustrates further advantages thereof. The extruder 410 is constructed in such a manner that the normally encountered thrust forces are balanced out to eliminate the heretofore known requirements for relatively strong thrust bearings. This balanced thrust feature will become apparent during the course of the following description.

The extruder 410 comprises an external casing 414 which is mounted for rotation about its own axis on ball bearings 416, 418 which in turn are supported upon an appropriate base or frame by the bearing mounts 420, 422 in a manner similar to the constructions described above. The casing 414 is provided with an entry port 424 which is in communication with a chamber 448 within the casing 14 and also in communication, once during each rotation of the casing 414, with an entry funnel 426 formed in the hopper support 428. An appropriate hopper is mounted on the hopper support 428 in a manner similar to hopper 46 illustrated in FIG. 1.

The casing is provided with an electrical heating element 430 and its associated commutator rings 432, 434 which are respectively mounted on an insulated block 436 and appropairte wires 438 connect the commutator ring and the heater 430. An end piece 440 is rigidly secured to the end of the casing 414 opposite from the entry port 424 and completely seals that end of the casing 414. Secured coaxially within the casing 414 and specifically to the end piece 440, and rotatable therewith, is a primary extrusion screw 442 which extends from the end plate 440 along the axis of the extrusion device 410 to the opposite end thereof. The primary extrusion screw 442 is provided with right hand extrusion thread 444. Also mounted coaxially within the casing 414 is a secondary extrusion screw 446 which serves not only as an extrusion screw, but also as a casing as will be described below. The secondary extrusion screw 446 is provided with right hand threads 448 of a major diameter complementary to the internal diameter of a casing 414 such that material deposited through the entry port 424 will travel to the right hand end of the device upon relative motion of the casing 414 in the direction of the arrow in FIG. 8 with respect to the secondary extrusion screw 446. The internal diameter of the secondary extrusion screw 446 is complementary to the major diameter thread 444 on the primary extrusion screw such that material which is positioned between those two elements is carried to the left hand end of the machine when the primary extrusion screw 442 rotates in the direction indicated by the arrow in the drawings. It will thus be appreciated that material travels from the entry port 424 to the right hand end of the extrusion device 10 through the space between the secondary screw 446 and the internal walls of the casing 414 and then toward the left hand end of the device 410 through the space between the primary extrusion screw 442 and the internal walls of the secondary extrusion screw 446. Obviously, the internal wall of the hollow secondary extrusion screw 446 operates with respect to the primary screw 442 in exactly the manner that the casing 414 operates with respect to the secondary extrusion screw 446. The secondary extrusion screw 446 is rigidly mounted on a bracket 450 secured to the frame of the device. However, it will be appreciated that the secondary extrusion screw 446 may alternatively be mounted within a bearing and appropriate pulley means may be provided to vary the rate of relative rotation between the secondary extrusion screw 446 and the combined casing 414 and primary securement screw 442. In addition, if the secondary extrusion screw 446 is rotated, the extrusion product may be produced in a helical configuration. An extrusion orifice 452 is provided axially of the secondary extrusion screw 446 at the end of the conically tapered portion 454. It will be readily appreciated that the material transported within the device 410 from the entry port 424 to the orifice 452 will be plasticated during its travel by the introduction of heat through the heater 430 and the working of the material by the threads 444, 448. The material will also be compacted to increase the pressure such that extrusion through the extrusion orifice 252 will be effected. If it is desired that the extrusion produced be formed in a helical shape, the secondary extrusion screw 446 may be mounted for rotation and the extrusion orifice 252 may be eccentrically positioned on the end member 454. The balanced thrust feature of this device results from the simultaneous forces in opposite direction which are applied between the two moving elements.

The features of the extrusion device 410 will be best appreciated by consideration following the description of the operations of the device. Upon the introduction of extrusion material through the entry port 424, relative rotation of the external casing 414 in the direction as illustrated in FIG. 8, will cause movement of the extrusion material from the left hand to the right hand end of the overall assembly. As the material is moved and is worked by the threads 448 on the extrusion screw 446, and as heat is introduced thereto through the heating element 430, the material will be plasticated. Continuous relative rotation will move the extrusion material completely to the left hand end of the assembly wherein it will then enter the space between the primary extrusion screw 442 and the internal walls of the secondary extrusion screw 446. Further continued rotation of those two elements in the direction of the arrows in FIG. 8 will further compact and plasticate the material and increase its pressure and will move the material towards the left hand end of the device and specifically toward the tapered tip 454. With the increased pressure built up within the internal chamber, the material will then be extruded out of the device 410 through the extrusion orifice 252 and will assume the shape of the extrusion orifice 252. It should be appreciated that the flow path of material within the extrusion 410 causes the material to reverse direction and pass essentially the same point twice such that the material is exposed two times to the heat introduced by the heating element 430. It will be further appreciated that normal thrust bearing problems associated with extrusion devices are eliminated by this construction since the thrust in one direction is essentially counterbalanced by the thrust in the other direction thus eliminating one of the more serious mechanical construction problems found in the prior art. It will be further realized that the outside-inside construction shown herein substantially reduces the overall length of the extrusion device as compared with the prior art devices thus requiring less floor space. These features all combine to produce a device which is of lowered cost as compared with the prior art and which produces a product in a more efficient manner. It will be further appreciated that if the secondary screw 446 were mounted for rotation, the flow rate through the extruder 410 could be selectively increased or decreased and the extruding device 410 would provide the advantages of a rotating die without the prior art difficulties of sealing or of mounting the entire assembly on a rotating turntable. Still further, the extrusion orifice 252 could be formed eccentrically to produce a helical end product.

Those skilled in the prior art will readily appreciate that the invention embodied in the several illustrative examples described above provides a significant and novel extruding machine for the production of extruded elements in simple linear shapes, fused tubes, continuous spirals or mesh tubes. The constructions described herein provide those features which have been heretofore sought in rotating die extrusion machines, but eliminate the rotating die and the requirement for sealing the rotating die against leakage between the die and the remaining elements of the extrusion apparatus. As a result of the elimination of the heretofore known sealing requirements, the present invention enables the easy extrusion of many materials, such as Teflon, which require high extrusion temperatures and pressures. Furthermore, this construction has extremely flexible characteristics wherein one relatively low cost unit can produce end products of a variety of different shapes, thicknesses, sizes, and constructions and wherein extruded material may be joined with pre-extruded or otherwise pre-shaped material to produce a variety of reinforced cylindrical tubing of either the open mesh construction of FIG. 7 or the closed, fluid-tight construction of FIG. 6.

Although there are several embodiments illustrated in the accompanying drawings and described above, a number of design changes may be made within these embodiments without departing from the basic concepts of the present invention. Accordingly, the following claims should be construed broadly in a manner consistent with the spirit and scope of the novelty and significance of the present invention.

What I claim is:

1. An extruder for applying a helical extrusion on a preformed core comprising an external cylindrical casing having internal cylindrical walls, an end piece rigid with and closing one end of said casing, an extrusion orifice formed eccentrically in said end piece, bearing means mounting said casing for rotation about its longitudinal axis, a first hollow extrusion screw mounted coaxially within said casing and having an extrusion thread of a major diameter complementary to the diameter of the internal cylindrical walls of said casing and having internal cylindrical walls, said first screw and said casing defining an extrusion material passageway therebetween, a second hollow screw providing a sealing function for said passageway mounted coaxially within said first extrusion screw having a thread of a major diameter complementary to the diameter of the internal cylindrical walls of said first extrusion screw and formed in the direction opposite to the direction of said extrusion thread of said first extrusion screw, said second screw rigidly secured to said external casing for rotation therewith, said hollow second screw providing a core passageway through said extruder, a core opening formed in said end piece, mandrel means at said end piece onto which extruded material is deposited, an entry port formed in said casing at the end opposite from said end piece and drive means engaged with said casing for rotating said casing and said second screw to deposit a helical extrusion on a preformed core moving through said extruder.

2. An extruder for applying a helical extrusion on a preformed core comprising an external cylindrical casing having internal cylindrical walls and having one closed end, bearing means mounting said casing for rotation about its longitudinal axis, a first hollow extrusion screw mounted coaxially within said casing and having an extrusion thread of a major diameter complementary to the diameter of the internal cylindrical walls of said casing and having internal cylindrical walls, said casing and said first screw defining an extrusion material passageway therebetween, a second hollow screw providing a sealing function for said passageway mounted coaxially within said first extrusion screw and having a thread of a major diameter complementary to the diameter of the internal cylindrical walls of said first extrusion screw, said second screw secured to said external casing for rotation therewith, at least one eccentric extrusion orifice formed at said closed end of said casing, said hollow second screw providing a core passageway through said extruder, a core opening formed in said closed end of said casing, mandrel means at said closed end of said casing onto which extruded material is deposited, an entry port formed in said casing at the end opposite from said closed end, heat means operatively engaged with said casing for heating extrusion material as it is moved toward said closed end, and drive means engaged with said casing for rotating said casing and said second screw to deposit a helical extrusion on a preformed core moving through said extruder.

3. An extruder for applying a helical extrusion on a preformed core comprising an external cylindrical casing having internal cylindrical walls and having one closed end, bearing means mounting said casing for rotation about its longitudinal axis, a first hollow extrusion screw mounted coaxially within said casing and having an extrusion thread of a major diameter complementary to the diameter of the internal cylindrical walls of said casing and having internal cylindrical extrusion screw walls, said casing and first screw defining an extrusion material passageway therebetween, a second hollow screw providing a sealing function for said passageway mounted coaxially within said first extrusion screw and having a thread of a major diameter complementary to the diameter of the internal cylindrical walls of said first extrusion screw and formed in the direction opposite to the direction of said extrusion thread of said first extrusion screw, said second screw rigidly secured to said external casing for rotation therewith, at least one eccentric extrusion orifice formed at said closed end of said casing, an entry port formed in the opposite end of said casing, a mandrel mounted coaxially within said second screw, mandrel bearing means mounting said mandrel for rotation about its longitudinal axis, drive means for rotating said mandrel for forming a helical core, said mandrel cooperatively positioned with respect to said extrusion orifice to receive material extruded from said extrusion orifice, heat means operatively engaged with said casing for heating extrusion material as it is moved toward said closed end, and drive means engaged with said casing for rotating said casing and said second screw to deposit a helical extrusion on said mandrel with helical core material positioned therebetween.

4. An extruder for applying a helical extrusion on a preformed core comprising an external cylindrical casing having internal cylindrical walls and having one closed end, bearing means mounting said casing for rotation about its longitudinal axis, a first hollow extrusion screw mounted coaxially within said casing and having an extrusion thread of a major diameter complementary to the diameter of the internal cylindrical walls of said casing and having internal cylindrical extrusion screw walls, said first screw and said casing defining an extrusion material passageway, a second hollow screw mounted coaxially within said first extrusion screw and having a thread of a major diameter complementary to the diameter of the internal cylindrical walls of said first extrusion screw and formed in the direction opposite to the direction of said extrusion thread of said first extrusion screw, said second screw rigidly secured to said external casing for rotation therewith with at least one extrusion orifice formed at said closed end of said casing, an entry port formed in the opposite end of said casing, a mandrel mounted coaxially within said second screw, said mandrel being tapered with its smaller end adjacent said extrusion orifice, feed means for feeding pre-extruded strands onto said mandrel in helical configuration, and drive means engaged with said casing for rotating said casing and said second screw to deposit a helical extrusion said mandrel with said helical strands positioned therebetween.

5. An extrusion device according to claim 1 further comprising bearing means mounting said first extrusion screw for rotation about its longitudinal axis, and drive means for said first extrusion screw for controlling the rate of relative rotation between said casing and said first extrusion screw.

References Cited by the Examiner

UNITED STATES PATENTS

| | | | |
|---|---|---|---|
| 1,516,841 | 11/1924 | Buttfield | 18—12 |
| 2,355,471 | 8/1944 | Rosenstein et al. | |
| 2,566,846 | 9/1951 | Martin | 18—13 |
| 2,653,351 | 9/1953 | Henning | 18—12 |
| 2,688,343 | 9/1954 | Cuddeback. | |
| 2,695,422 | 11/1954 | Gray | 18—12 X |
| 2,722,263 | 11/1955 | Beare et al. | |
| 2,750,626 | 6/1956 | Henning | 18—13 |
| 2,800,683 | 7/1957 | Teichmann | 18—13 |
| 2,933,762 | 4/1960 | Pumphrey | 18—13 |
| 2,948,922 | 8/1960 | Meskat | 18—12 |
| 3,153,261 | 10/1964 | Huszar | 18—12 X |

FOREIGN PATENTS

| | | |
|---|---|---|
| 614,800 | 12/1948 | Great Britain. |
| 618,536 | 2/1949 | Great Britain. |
| 626,945 | 7/1949 | Great Britain. |
| 809,790 | 3/1959 | Great Britain. |

WILLIAM J. STEPHENSON, *Primary Examiner.*

MICHAEL V. BRINDISI, L. S. SQUIRES,
*Assistant Examiners.*